Oct. 26, 1971    R. P. HICKMAN    3,615,087
WORKBENCHES

Filed March 3, 1969    3 Sheets-Sheet 1

INVENTOR
RONALD P. HICKMAN
BY
Watson, Cole, Grindle & Watson
ATTORNEY

Oct. 26, 1971  R. P. HICKMAN  3,615,087
WORKBENCHES
Filed March 3, 1969  3 Sheets-Sheet 2
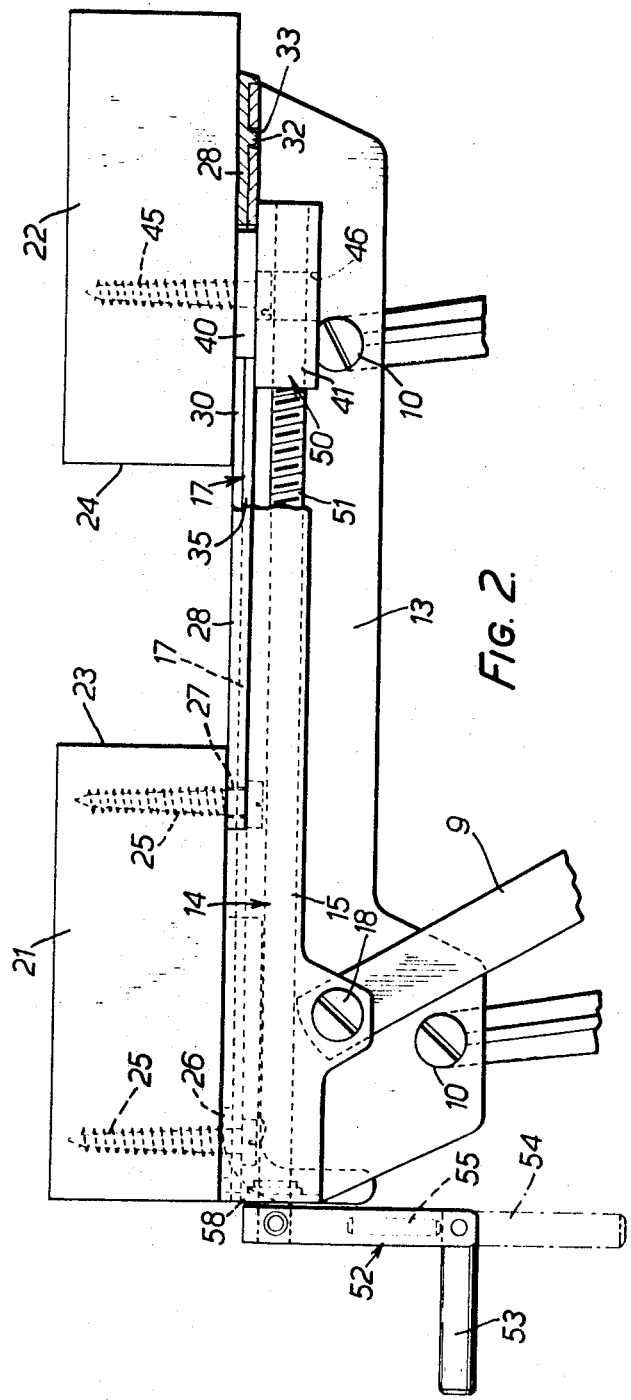
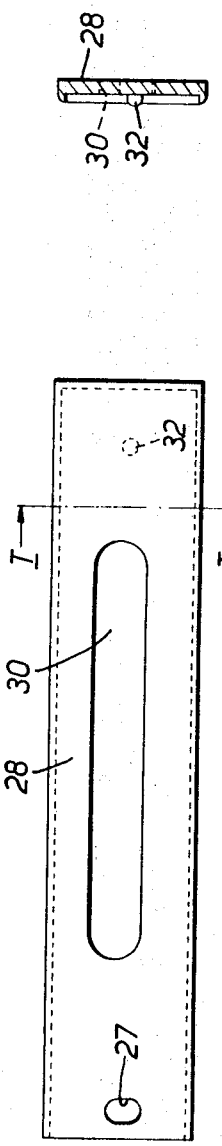
INVENTOR
RONALD P. HICKMAN
BY
*Watson Cole Grindle & Watson*
ATTORNEY Oct. 26, 1971 R. P. HICKMAN 3,615,087
WORKBENCHES
Filed March 3, 1969 3 Sheets-Sheet 3
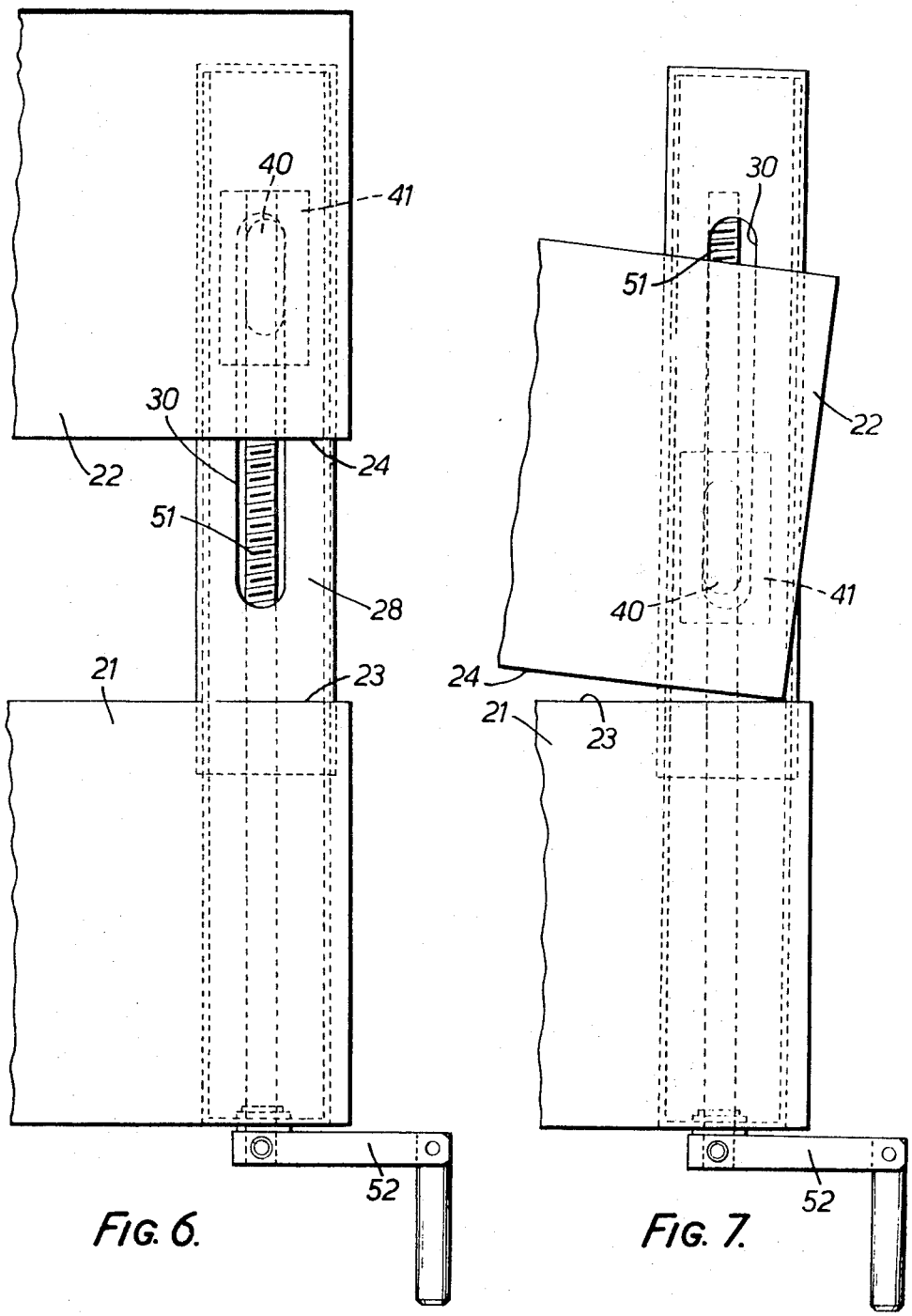
INVENTOR
RONALD P. HICKMAN
BY
*Watson, Cole, Grindle & Watson*
ATTORNEY

United States Patent Office
3,615,087
Patented Oct. 26, 1971

3,615,087
WORKBENCHES
Ronald Price Hickman, "Badgers," Middle St., Nazeing, Waltham Abbey, Essex, England
Filed Mar. 3, 1969, Ser. No. 803,600
Claims priority, appplication Great Britain, Mar. 4, 1968, 10,484/68
Int. Cl. B25b 1/10, 1/24
U.S. Cl. 269—244                                 14 Claims

ABSTRACT OF THE DISCLOSURE

A workbench of saw-horse height has its top formed by a pair of longitudinally extending top members which form a working surface and which are carried by transverse supports. One of the top members is fixed with respect to the supports but the other is horizontally movable towards and away from the fixed top member to form a vise between the opposed vertical faces of the top members. Adjacent each end the top members are interconnected by screw threaded rods which are restrained against axial movement at their ends adjacent the fixed top members but which are received in nuts connected to the movable top member. The connection of the nut to the movable top member allows independent operation of the screw threaded rods to permit the gap between the vertical faces to be greater at one end than at the other.

---

This invention relates to workbenches and is concerned with the provision of an arrangement wherein the bench has a vice incorporated as part of its basic structure. With many applications it is desirable to be able to clamp up an elongated timber or other workpiece but prior proposals have not enabled this to be done in a satisfactory manner. Specifically it has not been possible readily to clamp up a tapered workpiece.

According to one aspect of the present invention a workbench includes a supporting structure bearing a pair of top members having upper surfaces lying in substantially the same plane, e.g. to form a working surface, at least one of the top members being movable with respect to the other to cause opposed substantially vertical faces thereof to be moved relatively towards and away from one another, said movement being caused by actuation of one or both of a pair of spaced clamping devices which are capable of independent operation to permit the gap between the vertical faces to be greater at one end than at the other.

According to one convenient arrangement the pair of top members between them afford the complete working surface of the bench. Thus the arrangement may be such that one top member is securely fixed to the supporting structure whilst the other top member is mounted for horizontal movement towards and away from the fixed top member. In an alternative construction a third top member may be included which is disposed on the side of the movable top member remote from the first, the third top member being rigidly secured to the supporting structure.

The supporting structure conveniently incorporates a pair of horizontal transverse supports to which one top member is securely fixed, the transverse supports affording horizontal slideways upon which the movable top member can bear during its movement. The transverse supports may take various forms but conveniently each may comprise an inverted channel member within which screw threaded devices are mounted, the movable top member being secured to slider members located by the channel members for substantially longitudinal movement with respect thereto. For example in this case the screw threaded devices may comprise screw threaded rods extending substantially at right angles to the vertical face of the stationary top member, and co-operating with screw threaded bores of associated slider members.

In order to allow the gap between the vertical faces to be greater at one end than the other the top member is preferably secured to the slider members by securing means which permit relative rotation about a vertical axis. However, where the top supports are channel members, the slider members may be located for longitudinal movement with respect to the channel members, e.g. by co-operating projections and slots provided respectively thereon, but preferably the slider members are located such that they can move laterally slightly with respect to the channels. Thus the slider member may have a projection which is laterally of a width which is less than the width of a locating slot provided by the channel member. This will permit the arcuate movement of an end (or both ends) of the movable top member. It will be appreciated that the same effect can be obtained in other ways, e.g. by relative movement between the associated slider member and means by which it is secured to the top member. Alternatively the relative movement could occur between the said securing means and the top member itself. A further possibility of allowing for the arcuate movement would be to permit the screw thread devices to move translationally at their ends opposite to the ends which co-operate with the slider members.

The supporting structure may include a base structure interconnected with the top members by supporting members which are capable of movement between a collapsed position in which the top members are in closed juxtaposition to the base structure and a working position in which the top members are spaced from and supported by the base structure.

The screw threaded rods are conveniently actuated by crank handles which each may be formed in two hinged sections to allow the crank to be folded for storage.

The invention may be carried into practice in a number of ways but two specific embodiments will now be described by way of example with reference to the accompanying drawings in which:

FIG. 2 is an end elevation, partly in section, of the upper end of the workbench showing the manner in which the top members act as a vise;

FIG. 4 is a plan view of a slideway incorporated in the workbench;

FIG. 5 is a cross-section of the slideway on the line T—T of FIG. 4;

FIG. 6 shows certain parts of the workbench in plan with the pair of top members of the bench in parallel spaced relationship, and FIG. 7 is a scrap plan view showing one end of the workbench with one of the top members drawn into contact with the other top member at one end only.

Figure 1:
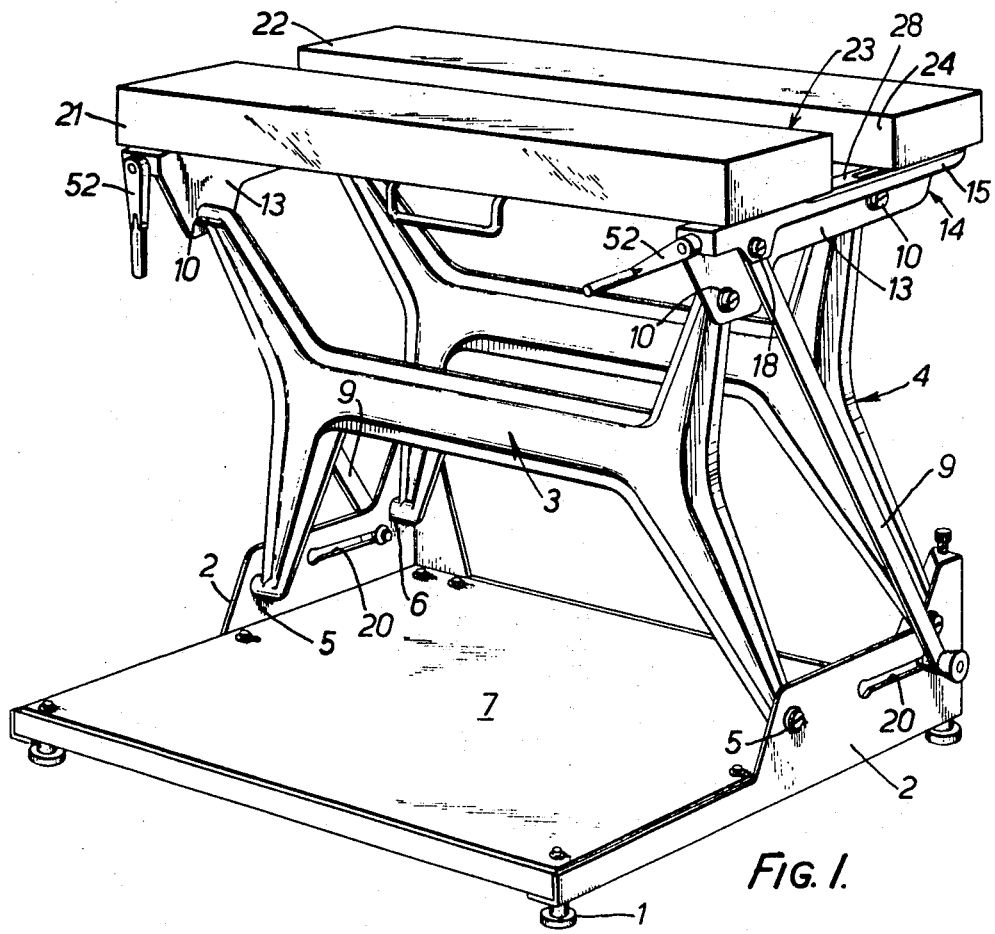
FIG. 1 is a perspective view of one form of collapsible workbench constructed in accordance with the present invention.

FIG. 1 shows the general construction of a workbench having a base structure incorporating a base board 7 mounted on adjustable feet 1 and provided at each end with a supporting bracket 2 by which a pair of generally H-shaped frames 3 and 4 are pivotally mounted at 5 and 6 respectively for movement between the working position of FIG. 1 and a collapsed storage position in which the top members are in close juxtaposition to the base board.

Figure 3:
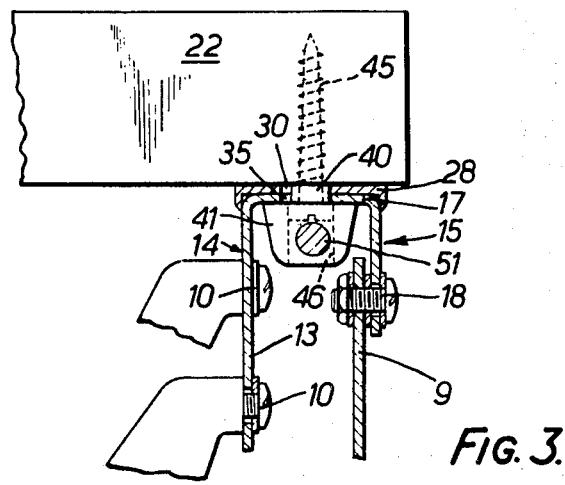
FIG. 3 is a front part-sectional elevation of the workbench of FIGS. 1 and 2.

The upper ends of the frames 3 and 4 each afford a pair of spaced limbs which are pivoted at 10 to a vertical web 13 of a generally U-shaped inverted channel 14 the detailed form of which is shown in FIGS. 2 and 3. Thus, referring to FIG. 3 the channel 14 also includes a vertical web 15 situated externally of the web 13, the two webs 13 and 15 being interconnected by a further horizontal web 17. The diagonal bars 9 are secured to the webs 15 at pivot points 18 at their upper ends and at their lower ends co-operate with slots 20 to allow for collapsing of the workbench.

The work surface of the workbench is afforded by a pair of spaced rectangular-section timber beams 21 and 22 having their horizontal surfaces aligned in the same plane. The beams also have opposed vertical surfaces 23 and 24 respectively, which as will be described, can be drawn towards one another from their spaced apart positions of FIGS. 1, 2 and 6. At each end the front beam 21 is rigidly connected to the horizontal web 17 of the respective channel by means of a pair of screws 25 as shown in FIG. 2, the front screw having a spacer washer 26 surrounding it between the beam and the web 17, and the rear screw 25 passing through a hole 27 in a slideway 28 formed for example of nylon or metal strip provided with a PTFE upper surface. The form of slideway is shown in detail in FIGS. 4 and 5. Apart from the hole 27 for the rear screw 25, it has a longitudinal slot 30 for a purpose to be described, and at its rear end is provided with a poppet stud 32 which, as shown in FIG. 2, is received in an aperture 33 in the horizontal web 17 of the channel 14.

The horizontal web 17 is provided with a longitudinal slot 35 of a shape corresponding to the slot 30 in the slideway and the two slots 30 and 35 have extending upwardly through them a projecting portion 40 formed on a slider member 41 shown in FIGS. 2 and 3.

The upper surface of the projection 40 abuts the underside of an end of the rear beam 22 and the slider member 41 is secured to the beam 22 at each end by a single screw 45, for which purpose the underside of the slider member 41 is provided with an open recess 46, as shown in FIG. 3.

As shown in FIG. 3 the slider member 41, below the web 17, is substantially wider than the width of the slots 30 and 35 so that the rear beam 22 whilst it can ride freely in a horizontal manner along the slideway, is prevented from moving bodily upward or of tilting upwards, e.g. adjacent its front edge. It is to be noted from FIG. 3 that the width of the projection 40 of the slider member 41 is less than the width of the slots 30 and 35 to allow for lateral movement of the slider member in a manner to be described. For this purpose also the width of the lower, wider part of the slider member 41 is less than the width of the space between the webs of the channel 14.

As shown in FIG. 2, on each side of the recess 46 the slider member 41 has a screw threaded bore 50 which co-operates with an externally screw threaded rod 51, the outer end of which, to the left in FIG. 2, carries a crank handle 52 provided with a hinged end section 53 which can be maintained either in the position shown in FIG. 2 for operating purposes or hinged downwards to the dotted line position 54 against the action of a spring biassed plunger 55 when not in use. In order to support the end of the rod 51 adjacent its handle 52 the webs 13 and 15 of the channel 14 are interconnected at the front by a transverse wall 58 through which the rod 51 passes, washers being provided on each side of the wall 58 and the rod being held in position by means of a circlip.

Accordingly, rotation of the rod 51 by means of its cranked handle 52 will cause horizontal movement of the slider member 41 towards or away from the front beam 21. The extent of movement of the slider member 41 is determined in one direction by abutment of the beams 21 and 22 against one another or in the case of rearward movement of the beam 22 by abutment of the projection 40 of the slider member 41 against the rear end of the slots 30 and 35. As shown in FIG. 1 the beams 21 and 22 can be drawn together or moved apart by simultaneous or independent operation of identical screw threaded rods at each end by means of a pair of crank handles 52. In this way, therefore, the beams 21 and 22, apart from providing substantially horizontal surfaces, which together provide a working top surface upon which many operations can be carried out, also act in the manner of a vise between which lengths of timber or other material can be clamped. It will accordingly be apparent that each threaded rod and its cooperating slider member 41 constitutes an extensible and contractible clamping device, and the two relatively spaced clamping devices are operable independently of each other to permit angular adjustment of the movable top member 22 about either of the vertical axes defined by the respective screws 45.

Assuming that the beams 21 and 22 are initially in spaced parallel relationship as shown for example in FIGS. 1 and 2 equal rotation of the crank handles at each end will cause the beams to be maintained in parallel relationship but it is a particular feature of this workbench that one or other of the handles 52 can be operated quite independently of the other to the maximum limits allowed by movement of the respective slider members 41. In other words one end of the rear beam 22 may be fully separated from the front beam 21 and remain so whilst the other end of the rear beam 22 is drawn up fully into contact with the front beam 21. This extreme position is shown in FIG. 7. It will be appreciated that during such independent movement of only one end of the beam 22, the beam will pivot at each end about the screws 45 by which it is secured to the two slider members 41. Assuming the extreme example mentioned above where one of the ends of the beam remains stationary, full clamping up for example of the right-hand end of the beam 22, with no movement of the left-hand end, in the manner shown in FIG. 7, will of necessity require the slider member 41 on the right to move to the left due to the arcuate movement of the right-hand end of the rear beam 22. Such sideways movement of the slider member 41 is accommodated by the excess width of the slots 30 and 35 in relation to the width of the projection 40 of the slider member 41 as shown and described with respect to FIG. 3. FIGS. 6 and 7 demonstrate this lateral movement of the slider member 41 between its extreme positions. Thus in FIG. 6 the outline of the projection 40 of the slider member 41 is shown as engaging the right-hand face of the elongated slot 30 in the slideway 28. After full clamping up to the position shown in FIG. 7 the projection 40 of the slider member 41 moves laterally to engage the lefthand side of the slot 30. Of necessity in this arrangement the slider member 41 has to tilt slightly with respect to the longitudinal axis of the slot 30 in the clamped up position of FIG. 7. This will cause slight lateral movement of the rear end of the screw threaded rod 51 as shown in FIG. 7 but this can be readily accommodated by means of the tolerances in the manner of mounting of the rod 51 at its front end.

It will be appreciated that the relative dispositions of the parts in FIGS. 6 and 7 show an extreme condition in which a full 3" closure of the beams has occurred at one end. In most instances such an extreme condition will not be required and there will usually be some clamping up at both ends either to the same or a different extent. The manner is which the slider members 41 are mounted to permit this independent movement avoids any difficulty of seizure of one or other of the screw threaded rods during clamping up or release as would normally be expected to occur with spaced screw threaded members of this type. Normally with spaced screw threaded members it is necessary to maintain substantially equal rotation of each in order to prevent seizure. The use of a pair of spaced screw threads of which one can be in tension thus applying a compressional load on a part clamped between the vertical faces, and the other can, if desired, take a reaction load in compression, is particularly useful for the clamping up of short parts. This is especially so where the point of grip of the part is outboard of one of the screw threads.

Accordingly, the workbench according to the invention enables a part to be clamped up within the space between the two beams irrespective of whether its side faces are parallel or inclined to one another.

Whilst with the embodiment of FIGS. 1 to 7 the screw threaded rods 51 are used in tension for clamping up, this is not essential and compression screws could be used.

Whilst the twin screws have been described as being entirely independently operable it is envisaged that it may be possible to provide an optional link between them when it is desired that they should maintain the pair of top members in constant alignment. Equally it is envisaged that each screw may be provided with a quick release in order that the members can be drawn together or moved apart separately for coarse adjustment prior to clamping up.

What I claim as my invention and desire to secure by Letters Patent is:

1. A workbench including a supporting structure, a pair of generally parallel elongated top members carried by the supporting structure, said top member forming a vise having relatively opposed vertical faces and having upper surfaces in a common horizontal plane, one of said top members being disposed on said supporting structure for movement toward and away from the other said top member, a pair of extensible and contractible relatively independently operable clamping devices interconnecting said movable top member and said supporting structure at locations spaced apart lengthwise of said movable top member for positively adjusting said movable top member toward and away from the other said top member, means connecting the movable said top member to each said clamping device for angular movement relative to said device about a vertical axis and providing for limited horizontal displacement of said axis in a direction parallel to the length of said movable top member, whereby to permit relative angular adjustment of said movable top member about either said vertical axis relative to the other said top member.

2. A workbench as claimed in claim 1 in which one of the top members is secured in a stationary manner to the supporting structure and the other top member is movable relatively to the supporting structure.

3. A workbench as claimed in claim 2 in which the supporting structure incorporates a pair of horizontal transverse supports extending beneath the top members, the said transverse supports affording horizontal slide surfaces upon which the movable top member can bear during its movement.

4. A workbench as claimed in claim 3 in which the clamping devices each comprise a screw threaded rod extending substantially at right angles to the vertical face of the stationary top member.

5. A workbench as claimed in claim 4 in which each screw threaded rod is axially fixed at its end adjacent the stationary top member and extends through a nut secured to the movable top member.

6. A workbench including a supporting structure, a pair of top members carried by the supporting structure, the top members having opposed vertical faces thereof forming a vise and having upper surfaces lying in substantially the same plane, at least one of the top members being movable with respect to the other to cause the said opposed substantially vertical faces to be moved relatively towards and away from one another, said movement being caused by actuation of one or both of a pair of spaced clamping devices which are capable of independent operation to permit the gap between the vertical faces to be greater at one end than at the other, one of the top members being secured in a stationary manner to the supporting structure and the other top member being movable relative to the supporting structure, said supporting structure incorporating a pair of horizontal transverse supports extending beneath the top members, the said transverse supports affording horizontal slide surfaces upon which the movable top member can bear during its movement, each said clamping device comprising a screw threaded rod extending at substantially right angles to the vertical face of the stationary top member, each said screw threaded rod being axially fixed at its end adjacent the stationary top member and extending through a nut secured to the movable top member, including location means extending between the movable top member and the transverse supports, said location means constraining the movable top member against upward movement away from the transverse supports.

7. A workbench as claimed in claim 6 in which the locating means limits lateral movement of the movable top member relatively to the transverse supports.

8. A workbench as claimed in claim 6 in which the locating means is formed by co-operating surfaces formed one on the transverse supports and one on an integral portion of each nut.

9. A workbench as claimed in claim 8 in which the transverse supports each include a horizontal web beneath which one of the screw threaded rods extends, with the said integral portion of associated nut extending upwards through a guide slot in the web.

10. A workbench as claimed in claim 9 in which each slot is laterally wider than its associated integral portion to permit limited lateral movement of the integral portion during independent operation of the screw threaded rods.

11. A workbench including a supporting structure, a pair of top members carried by the supporting structure, the top members having opposed vertical faces thereof forming a vise and having upper surface lying in substantially the same plane, at least one of the top members being movable with respect to the other to cause the said opposed substantially vertical faces to be moved relatively towards and way from one another, said movement being caused by actuation of one or both of a pair of spaced clamping devices which are capable of independent operation to permit the gap between the vertical faces to be greater at one end than at the other, one of the top members being secured in a stationary manner to the supporting structure and the other top member being movable relative to the supporting structure, said supporting structure incorporating a pair of horizontal transverse supports extending beneath the top members, the said transverse supports affording horizontal slide surfaces upon which the movable top member can bear during its movement, each said clamping device comprising a screw threaded rod extending at substantially right angles to the vertical face of the stationary top member, each said screw threaded rod being axially fixed at its end adjacent the stationary top member and extending through a nut secured to the movable top member, each nut being secured to the movable top member by a single vertical connection which permits arcuate movement of the movable top member about the axis of the vertical connection during independent operation of the screw threaded rods.

12. A workbench as claimed in claim 1 in which the pair of top members between them afford the complete working surface of the bench.

13. A workbench as claimed in claim 1 in which the supporting structure includes a base structure interconnected with the top members by supporting members which are capable of movement between a collapsed position in which the top members are in close juxtaposition to the base structure and a working position in which they are spaced from and supported by the base structure.

14. A workbench comprising a supporting structure; a pair of generally parallel elongated top members carried by said supporting structure in normally spaced apart relation to grip a workpiece therebetween, one of said top members being fixed to said supporting structure, the other of said top members being movable on said supporting structure toward and away from said fixed top member, a pair of threaded adjusting means carried by said supporting structure for rotation about substantially parallel horizontal axes and secured against axial movement relative to said structure, said threaded means being horizontally deflectible in a direction lengthwise to said movable top member, slider members guided for horizontal movement on said supporting structure in threaded engagement with said threaded means for adjustment axially along said threaded means transversely to the length of said movable top member and for horizontal deflection with said threaded means, said slider members being pivotally connected to said movable top member at relatively spaced locations along the length of the latter, for relative angular movement about vertical axes.

References Cited

UNITED STATES PATENTS

| | | | |
|---|---|---|---|
| 1,033,921 | 7/1912 | Morton | 269—164 X |
| 1,328,492 | 1/1920 | Carman | 269—139 X |
| 1,765,321 | 6/1930 | Bodmer | 269—244 X |
| 2,684,275 | 7/1954 | Guth | 144—287 X |
| 3,061,302 | 10/1962 | Dennis | 269—244 X |

FOREIGN PATENTS 929,321    1955    Germany.

ANDREW R. JUHASZ, Primary Examiner

D. D. EVENSON, Assistant Examiner

U.S. Cl. X.R.

144—287; 269—139, 164, 245